United States Patent [19]
Curen et al.

[11] Patent Number: 5,911,198
[45] Date of Patent: Jun. 15, 1999

[54] ANIMAL STIMULATOR

[75] Inventors: Greg Van Curen, Fremont; Michael D. Westrick, Fort Wayne, both of Ind.

[73] Assignee: Innotek Pet Products, Inc., Garrett, Ind.

[21] Appl. No.: 09/006,718

[22] Filed: Jan. 14, 1998

Related U.S. Application Data

[63] Continuation-in-part of application No. 08/693,888, Aug. 5, 1996, abandoned.

[51] Int. Cl.$^6$ .................................................. A01K 29/00
[52] U.S. Cl. ............................................................ 119/720
[58] Field of Search .................................... 119/859, 858, 119/720, 721, 908

[56] References Cited

U.S. PATENT DOCUMENTS

| | | |
|---|---|---|
| 3,844,840 | 10/1974 | Bender . |
| 4,087,960 | 5/1978 | Koichi . |
| 4,827,534 | 5/1989 | Haugen . |
| 4,919,082 | 4/1990 | Tsai . |
| 4,973,944 | 11/1990 | Maletta . |
| 5,029,342 | 7/1991 | Stein et al. . |
| 5,353,744 | 10/1994 | Custer . |
| 5,370,082 | 12/1994 | Wade ....................................... 119/859 |
| 5,424,800 | 6/1995 | Suzuki . |
| 5,460,123 | 10/1995 | Kolz ........................................ 119/220 |
| 5,533,470 | 7/1996 | Rose . |
| 5,575,242 | 11/1996 | Davis et al. ............................. 119/721 |

*Primary Examiner*—Thomas Price
*Attorney, Agent, or Firm*—Barnes & Thornburg

[57] ABSTRACT

A collar mounted animal control device which administers a stimulus to an animal. The control device includes at least one photovoltaic member that produces energy for the administered stimulus and an energy storage device that can be charged by the at least one photovoltaic member. A charging circuit can be coupled between the photovoltaic member and the energy storage device and used to accumulate and periodically supply energy to the energy storage device.

12 Claims, 4 Drawing Sheets

ANIMAL STIMULATOR

This application is a Continuation-in-part of U.S. Pat. application Ser. No. 08/693,888, Filed Aug. 5, 1996 abandoned.

BACKGROUND AND SUMMARY OF THE INVENTION

The present invention relates to a solar powered animal control device.

Animal control devices are known. These devices have been used in a variety of applications including confinement systems, bark inhibiter systems and remote controlled animal stimulators. These devices typically administer a stimulus to an animal to keep it within a predefined boundary, encourage it to cease an undesired activity, or engage in a desired activity. The stimulus may be in a variety of forms including an electrical shock, a sound, a spray, or a mechanical stimulus, for example, tightening of a collar worn by the animal.

These devices are typically powered by a battery which provides power for only a limited period of time. This battery must either be changed, or in the case of a rechargeable battery, recharged. Replacement of the battery or recharging requires that the control device be removed from the animal temporarily. During this time, the animal is unrestrained and may leave the confinement area or engage in undesirable activity. A further complication with these current units is that if the battery is sufficiently discharged, the control device will not operate. If the user of the animal control device is unaware of this discharged state, the animal may leave a confinement area and be injured, cause damage and/or engage in undesirable activity.

The present invention is directed to solving these above-described problems with current battery powered animal control devices. An embodiment of an animal control device constructed in accordance with the present invention includes a stimulation device, structure for fitting the stimulation device to the animal, and a photovoltaic member. The stimulation device produces a stimulus and selectively applies the stimulus to an animal. The photovoltaic member produces energy to power the stimulation device in response to exposure of the photovoltaic member to electromagnetic radiation.

The animal control device may further include an energy storage device. The energy storage device receives energy from the photovoltaic member and supplies energy to the stimulation device. In this embodiment, the animal control device may further include a diode having an anode electrically connected to the photovoltaic member and a cathode electrically connected to the energy storage device. Alternatively, this embodiment of the animal control device may further include means for isolating the energy storage device from the photovoltaic member to help prevent the energy storage device from discharging through the photovoltaic member. The isolating means may include the above-described diode, having an anode electrically connected to the photovoltaic member and a cathode electrically connected to the energy storage device. The energy storage device may be a rechargeable battery.

The photovoltaic member may include at least one solar cell. This solar cell may be attached to the fitting means.

The fitting means may be a collar.

The photovoltaic member may produce electrical energy having either a voltage or a current dependent upon solar electromagnetic radiation.

The stimulation device may include at least one probe that delivers an electrical signal to the animal as the stimulus.

The stimulus may be one or more of the following: an electrical signal administered to the animal, an audio signal administered to the animal, a spray administered to the animal, and a mechanical stimulus administered to the animal. The mechanical stimulus may include tightening of a collar fitted to the animal.

The stimulation device may include a bark inhibitor, a receiver and stimulator for a remote controlled trainer, and a receiver and stimulator for a confinement system.

Other objects, advantages and novel features of the present invention will become apparent from the following detailed description of the invention when considered in conjunction with the accompanying drawings.

DETAILED DESCRIPTION OF THE DRAWINGS

Figure 1:
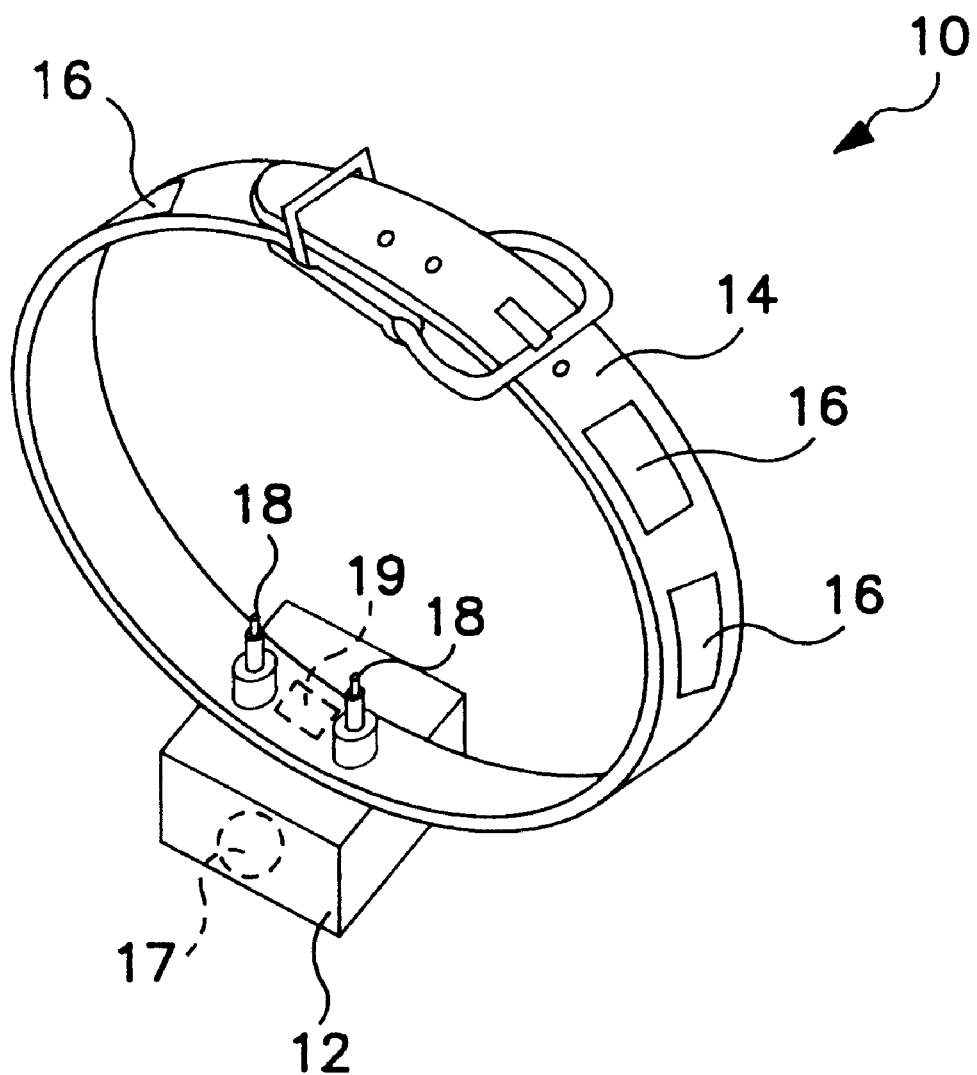
FIG. 1 is a perspective view of a solar powered animal control device constructed in accordance with the present invention.

A perspective view of a solar powered animal control device 10 constructed in accordance with the present invention is shown in FIG. 1. Device 10 may be used in conjunction with, for example, an animal confinement system, a bark inhibiter system, or a remote controlled training system.

Device 10 includes a stimulator 12 for administering a stimulus to an animal. Device 10 also includes fitting structure 14, such as a collar, as shown, for fitting stimulator 12 to a variety of differently sized animals. Although a collar is shown for fitting structure 14, it is to be understood that the present invention is not limited by the type of structure used to fit stimulator 12 to an animal.

Device 10 additionally includes a plurality of photovoltaic members 16 that produce energy to power stimulator 12 in response to exposure to electromagnetic radiation. As can be seen, photovoltaic members 16 are attached to fitting structure 14. However, it is to be understood that members 16 may be attached to other components of device 10, such as stimulator 12. The present invention is not limited by the positioning of members 16, other to ensure that they are adequately exposed to at least one source of electromagnetic radiation. Furthermore, it is to be understood that although a plurality of members 16 are shown, a single member 16 may be used.

Stimulator 12 is shown as including a pair of probes 18 that administer an electrical signal, such as an open-circuit voltage to the animal. Although stimulator 12 is shown as being of a type that administers an electrical signal as a corrective stimulus, it is to be understood that other simulators 12 may be used with device 10 of the present invention. For example, stimulator 12 may administer an audio signal, as generally indicated by speaker 17, a spray directed at the animal, as generally indicated by block 19, examples of which are shown in U.S. Pat. Nos. 4,627,385 and 5,046,453, or other mechanical stimulus, such as one or more probes that contact the skin of the animal or a mechanical stimulus that tightens fitting means 14. The present invention is not limited by the type of stimulator unit 12 used.

Figure 2:
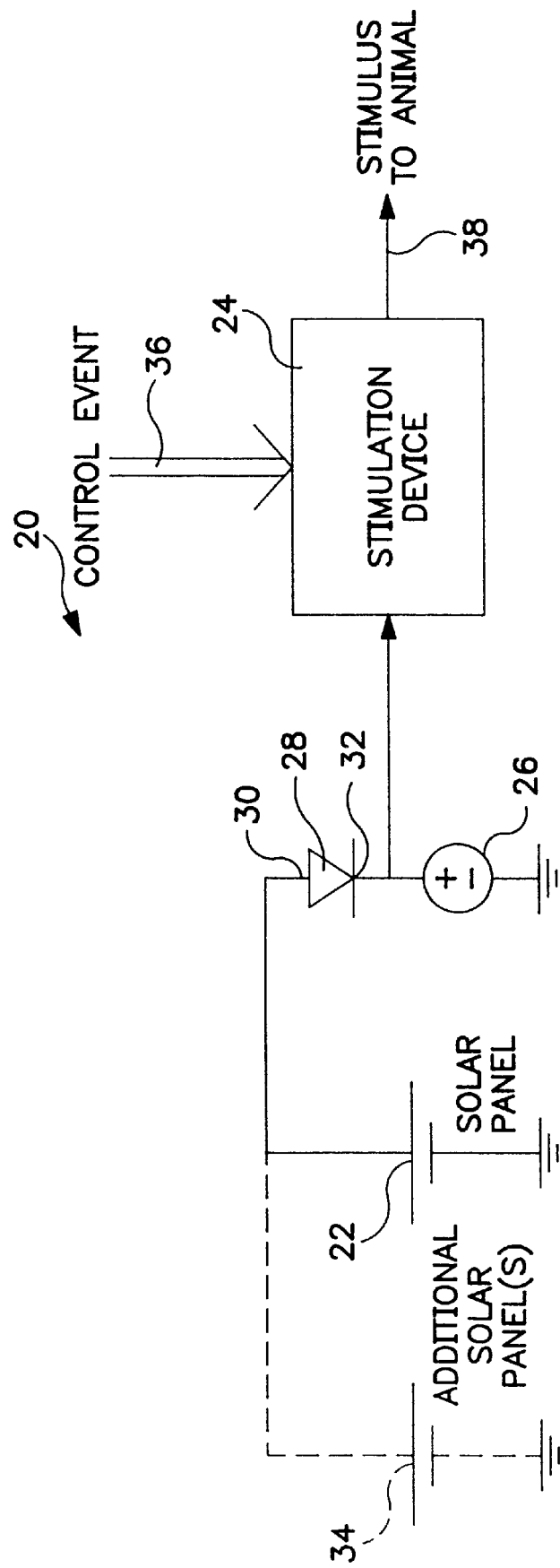
FIG. 2 is a block diagram of a solar powered animal stimulator constructed in accordance with the present invention.

A block diagram of an animal control device 20 constructed in accordance with the present invention is shown in FIG. 2. As can be seen, device 20 includes a photovoltaic member 22 in the form of a solar panel and a stimulation device, generally designated by reference numeral 24. Device 20 also includes an energy storage device 26 that receives energy from solar panel 22 and supplies that energy to stimulation device 24. In one or more embodiments of device 20, energy storage device 26 may be a rechargeable battery.

Device 20 may additionally include structure for isolating energy storage device 26 from photovoltaic member 22, such as diode 28. As shown, anode 30 of diode 28 is electrically connected to photovoltaic member 22 and cathode 32 is electrically connected to energy storage device 26. This configuration allows photovoltaic member 22 to electrically charge energy storage device 26, while, at the same time, preventing discharge of energy in energy storage device 26 through solar panel 22.

As shown, device 20 may include one or more additional photovoltaic members in the form of, for example, solar cells 34, as discussed above.

As generally indicated by large arrow 36, stimulation device 24 responds to control event 36 by administering a stimulus to an animal. Control event 36 may be a variety of things, such as an animal nearing a confinement boundary, barking or whining of an animal detected either through vibration of the vocal cords of the animal or the sound of the barking or whining, or a remote control signal from a transmitter. Stimulation device 24 responds to this control event by administering one or more stimuli to an animal, as generally indicated by arrow 38 in FIG. 2.

As discussed above, the present invention significantly reduces the likelihood of power being unavailable for stimulation device 24 which can occur with conventional systems that are powered only by a battery. During periods of sunlight, stimulator 24 is powered by one or more photovoltaic members while one or more energy storage devices are recharged. During times of darkness, the one or more energy storage devices supply all power to stimulator 24. This combined use of battery power and solar power helps significantly reduce the likelihood of the animal control device of the present invention from failing to operate because of insufficient power, as can occur with other conventional systems that are only battery powered.

In order to charge an energy storage device such as a storage battery, it may be necessary to supply a voltage thereto which is above a certain threshold, e.g. the output voltage of the storage battery. When relying upon a photovoltaic member or bank of photovoltaic members which produce a voltage that is below the threshold level needed to charge an energy storage device, e.g., a storage battery, a charging circuit can be included into the circuit depicted in FIG. 2.

Figure 3:
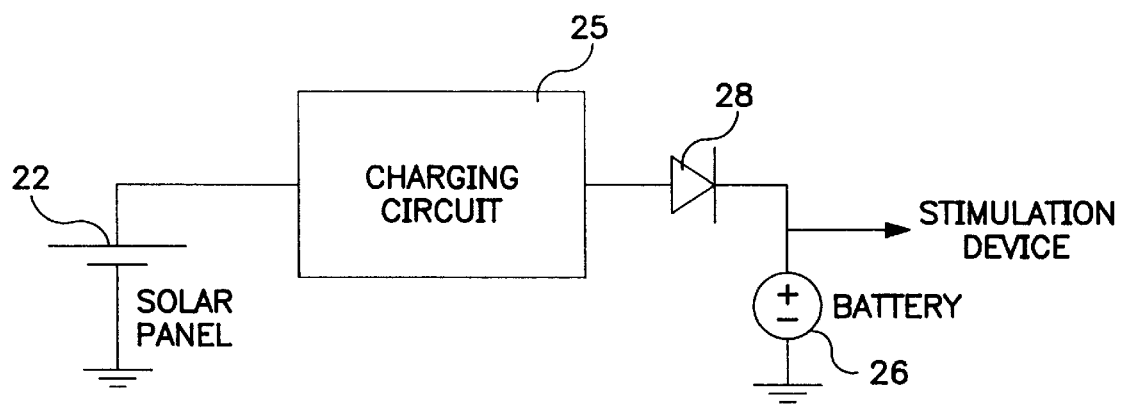
FIG. 3 is a block diagram of a solar powered animal stimulator according to another embodiment of the present invention which includes a charging circuit.

FIG. 3 is a block diagram of a solar powered animal control device according to another embodiment of the present invention which includes a charging circuit. In FIG. 3, a charging circuit 25 is shown as being provided between photovoltaic member 22 and energy storage device 26. The charging circuit 25 comprises a low current switching regulator and a capacitor. The photovoltaic member 22 applies a voltage to the capacitor. The low current switching regulator allows the voltage applied to the capacitor to built up to a desired level after which the capacitor discharges. When the capacitor discharges, the output voltage across the capacitor is applied to the energy storage device 26. In this manner, the capacitor is pulsed discharged to meet the charging requirements of the energy storage device 26.

Figure 4:
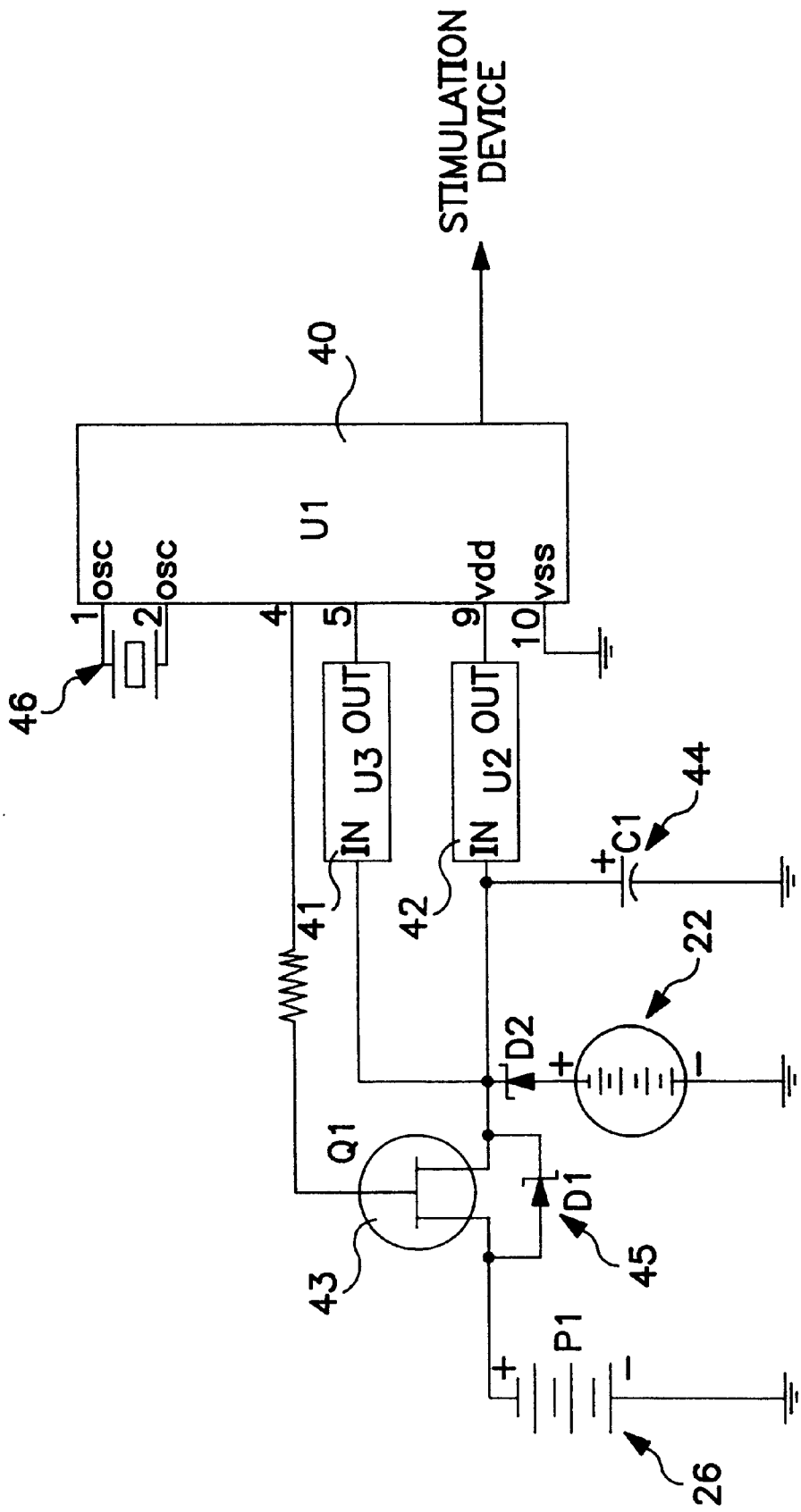
FIG. 4 is a block diagram of the details of a charging circuit according to one embodiment of the present invention.

FIG. 4 is a block diagram of the details of a charging circuit according to one embodiment of the present invention.

The charging circuit 25 indicated by broken lines, includes micro controller 40, voltage detector 41, voltage regulator 42, field effect transistor (FET) 43 and capacitor 44. The FET 43 is provided between energy storage device (e.g. rechargeable Nicad battery) 26 and micro controller 40 in parallel with diode 45. The capacitor 44 is connected between the output of FET 43 and voltage regulator 42. The output of voltage regulator 42 is connected to micro controller 40. As depicted, voltage detector 41 is provided between photovoltaic member 22 and micro controller 40.

The charging circuit operates as follows. When light availability is low, diode 45 is forward biased so that micro controller 40 and stimulation device 24 are powered by energy storage device 26 (e.g., a 2.4~2.8 volt Nicad battery). When light availability is high, capacitor 44 will begin to charge. When capacitor 44 is charged to a preset voltage, e.g. 3.0 volts, voltage detector 41 will trip and micro controller 40 will fire FET 43, thereby generating a high current pulse which lowers the voltage across capacitor 44 (e.g., to approximately 2.2 volts) and injecting ample charge current (e.g. approximately 20 mA) for a short time period. As depicted, the charging circuit 25 also includes an oscillator 46 which is connected to micro controller 40 for use in timing the charging pulses to the energy storage device 26.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. An animal control device, comprising:
    a collar;
    a stimulation device coupled to the collar for producing a stimulus and selectively applying the stimulus to an animal wearing the collar;
    a photovoltaic member coupled to the collar for producing energy to power the stimulation device in response to exposure of the photovoltaic member to electromagnetic radiation;
    an energy storage device for receiving energy from the photovoltaic member and for supplying energy to the stimulation device; and
    a charging circuit coupled between the photovoltaic member and the energy storage device which charging circuit accumulates and periodically supplies energy to the energy storage device.

2. The animal control device of claim 1, wherein the energy storage device is a rechargeable battery.

3. The animal control device of claim 2, further comprising a diode having an anode electrically connected to the charging circuit and a cathode electrically connected to the energy storage device.

4. The animal control device of claim 1, wherein the photovoltaic member includes at least one solar cell.

5. The animal control device of claim 1, wherein the photovoltaic member produces electrical energy having at least one of a voltage and a current dependent upon solar electromagnetic radiation.

6. The animal control device of claim 1, wherein the stimulation device includes at least one probe that delivers an electrical signal to the animal as the stimulus.

7. The animal control device of claim 1, wherein the stimulus is one of an electrical signal administered to the animal, an audio signal administered to the animal, a spray administered to the animal, and a mechanical stimulus administered to the animal.

8. The animal control device of claim 7, wherein the mechanical stimulus includes tightening of a collar fitted to the animal.

9. The animal control device of claim 1, wherein the stimulation device includes one of a bark inhibitor, a receiver and stimulator for a remote controlled trainer, and a receiver and stimulator for a confinement system.

10. The animal control device of claim 1, wherein the charging circuit includes a capacitor which can be charged by the photovoltaic member and used to charge the energy storage device and a micro controller for controlling operation of the charging circuit.

11. The animal control device of claim 10, wherein the charging circuit further comprises a voltage detector for monitoring the charge on the capacitor and a voltage regulator for controlling the charge on the capacitor.

12. The animal control device of claim 11, wherein the charging circuit further comprises a field effect transistor for pulsing charge currents to the energy storage device.

\* \* \* \* \*